(12) United States Patent
Kato et al.

(10) Patent No.: US 11,923,543 B2
(45) Date of Patent: Mar. 5, 2024

(54) NONAQUEOUS ELECTROLYTE SECONDARY BATTERY

(71) Applicant: Panasonic Intellectual Property Management Co., Ltd., Osaka (JP)

(72) Inventors: Yoshio Kato, Osaka (JP); Yoshinori Kida, Hyogo (JP); Masahiro Shiraga, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 558 days.

(21) Appl. No.: 17/049,384

(22) PCT Filed: Feb. 22, 2019

(86) PCT No.: PCT/JP2019/006750
§ 371 (c)(1),
(2) Date: Oct. 21, 2020

(87) PCT Pub. No.: WO2019/207933
PCT Pub. Date: Oct. 31, 2019

(65) Prior Publication Data
US 2021/0249658 A1    Aug. 12, 2021

(30) Foreign Application Priority Data
Apr. 27, 2018 (JP) ................. 2018-086477

(51) Int. Cl.
*H01M 4/583* (2010.01)
*H01M 4/02* (2006.01)

(52) U.S. Cl.
CPC ...... *H01M 4/583* (2013.01); *H01M 2004/027* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 2002/0015888 A1 | 2/2002 | Omaru et al. | |
| 2005/0014067 A1* | 1/2005 | Tenno | H01M 4/364 252/182.1 |

FOREIGN PATENT DOCUMENTS

| | | |
|---|---|---|
| JP | H07-134988 A | 5/1995 |
| JP | 9-241013 A | 9/1997 |
| JP | 2005-50807 A | 2/2005 |
| JP | 2011-119139 A | 6/2011 |

(Continued)

OTHER PUBLICATIONS

International Search Report dated May 14, 2019, issued in counterpart International Application No. PCT/JP2019/006750. (2 pages).

(Continued)

*Primary Examiner* — Wyatt P McConnell
(74) *Attorney, Agent, or Firm* — WHDA, LLP

(57) ABSTRACT

A nonaqueous electrolyte secondary battery according to an embodiment of the present invention includes a positive electrode, a negative electrode, and a nonaqueous electrolyte, wherein the negative electrode contains, as a negative electrode active material, graphite particles having a volume per mass, of pores having a diameter of 2 nm or less determined by the DFT method from nitrogen adsorption isotherm, of 0.3 mm3/g or less.

3 Claims, 3 Drawing Sheets

(56) References Cited

FOREIGN PATENT DOCUMENTS

| JP | 2011-258585 A | 12/2011 |
|---|---|---|
| JP | 2014-167906 A | 9/2014 |
| JP | 2014-170724 A | 9/2014 |
| JP | 2015-230915 A | 12/2015 |

OTHER PUBLICATIONS

Placke et al., "Influence of graphite surface modifications on the ratio of basal plane to "non-basal plane" surface area and on the anode performance in lithium ion batteries", Journal of Power of Sources, Oct. 28, 2011, vol. 200, pp. 83-91. Cited in ISR. (10 pages).

English Translation of Chinese Search Report dated Feb. 11, 2023 for the related Chinese Patent Application No. 201980027465.7.

\* cited by examiner

NONAQUEOUS ELECTROLYTE SECONDARY BATTERY

TECHNICAL FIELD

The present invention relates to a non-aqueous electrolyte secondary battery.

BACKGROUND ART

Recently, there has been widely used a non-aqueous electrolyte secondary battery which comprises a positive electrode, a negative electrode, and a non-aqueous electrolyte and which achieves charge and discharge by movement of lithium ions between the positive electrode and the negative electrode, as a secondary battery providing high output and a high energy density.

For example, Patent Literature 1 discloses a material for a lithium ion secondary battery negative electrode, including carbonaceous covering graphite particles obtained by covering a carbonaceous material with graphite particles having pores therein, wherein the carbonaceous covering graphite particles have a volume of micropores of 1 nm or less, of 0.0010 to 0.0020 $cm^3/g$, as determined based on an adsorption isotherm due to nitrogen according to the HK method, and have a volume of micropores of 1 to 100 nm, of 0.020 to 0.040 $cm^3/g$, as determined according to the BJH method, and a lithium secondary battery negative electrode containing the material for a lithium ion secondary battery negative electrode.

CITATION LIST

Patent Literature

PATENT LITERATURE 1: Japanese Unexamined Patent Application Publication No. 2014-170724

SUMMARY

Patent Literature 1 has found that the minimum value of the micropore size of graphite particles, necessary for enhancements in high-rate characteristics, is almost 1 nm provided that the graphite particles are subjected to covering necessary for practical use; has established proper volumes of micropores having a micropore size of 1 nm or less and 1 nm or more; and has disclosed that a lithium ion secondary battery which is excellent in high-rate characteristics without losing the capacity, the first charge-discharge efficiency, and cycle characteristics was obtained. Patent Literature 1 has evaluated performance of the lithium ion secondary battery in the case of charge-discharge cycles repeated fifty times, but has not revealed any performance in the case of charge-discharge cycles performed more times.

It is an advantage of the present disclosure is to provide a non-aqueous electrolyte secondary battery which can be improved in long term charge-discharge cycle characteristics.

A non-aqueous electrolyte secondary battery according to one aspect of the present disclosure comprises a positive electrode, a negative electrode, and a non-aqueous electrolyte, wherein the negative electrode contains graphite particles having a volume per mass of micropores having a micropore size of 2 nm or less, of 0.3 $mm^3/g$ or less, as determined from a nitrogen adsorption isotherm according to a DFT method, as a negative electrode active material.

A non-aqueous electrolyte secondary battery according to one aspect of the present disclosure can be improved in long term charge-discharge cycle characteristics.

DESCRIPTION OF EMBODIMENTS

Figure 1:
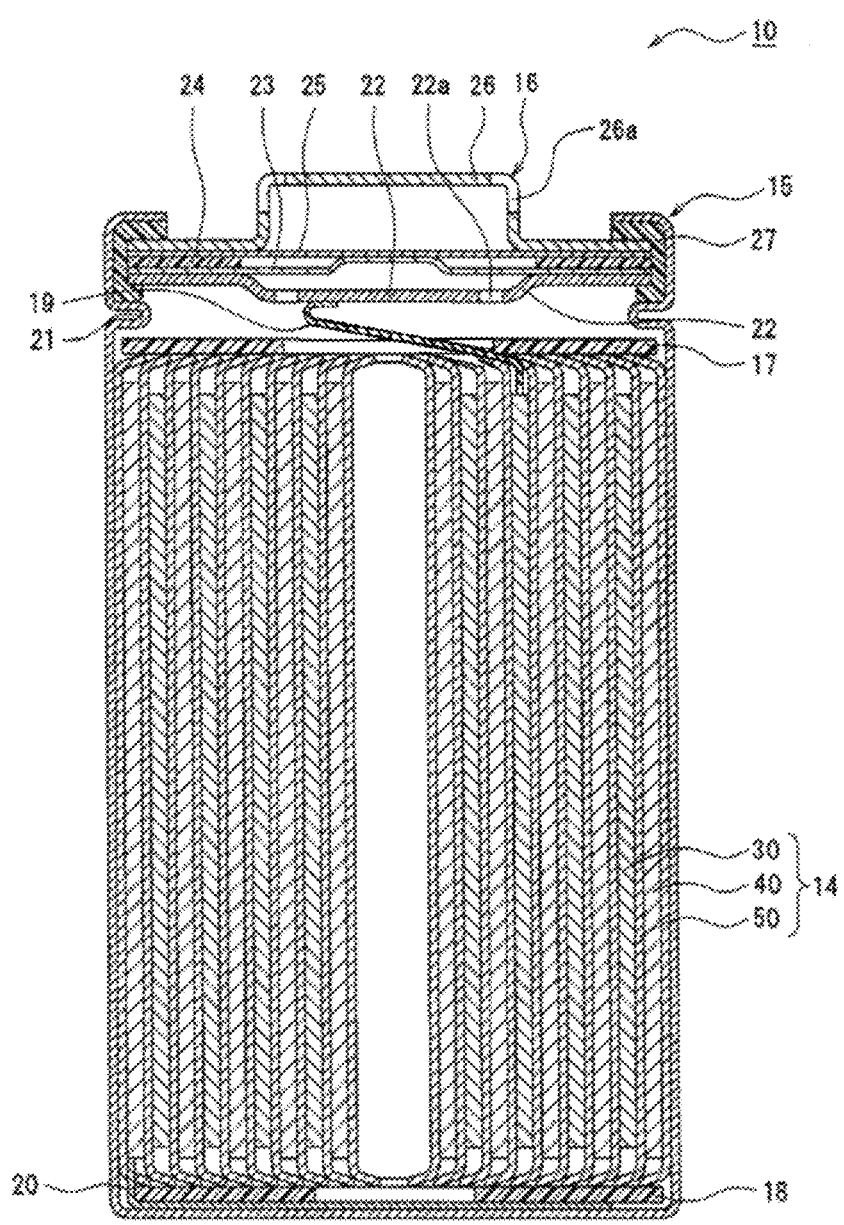
FIG. 1 is a longitudinal sectional view showing a configuration of a non-aqueous electrolyte secondary battery of an exemplary embodiment.

For example, Patent Literature 1 has found that the minimum value of the micropore size of graphite particles, necessary for enhancements in high-rate characteristics, is almost 1 nm in terms of the micropore structure of the graphite particles, has disclosed that proper volumes of micropores having a micropore size of 1 nm or less and 1 nm or more were established, and has disclosed that a volume of micropores of 1 nm or less, of less than 0.0010 $cm^3/g$, as determined according to the HK method (Horvath-Kawazoe method), causes no reaction interface necessary for a reaction of lithium ions in a graphite layer to be ensured, and causes no excellent high-rate characteristics to be obtained. On the other hand, the charge-discharge cycle has been performed only fifty times in the test of cycle characteristics in Patent Literature 1, and there has not been revealed any performance of a non-aqueous electrolyte secondary battery containing graphite particles as a negative electrode active material, in a long term charge-discharge cycle (for example, 500 cycles or more).

On the contrary, the present inventors have made intensive studies, and, as a result, have considered that the basal portions of graphite crystals in graphite particles for use as a negative electrode active material do not involve in insertion/elimination of, for example, lithium ions along with charge and discharge, unlike the edge portions of the graphite crystal, and thus have found that a side reaction with a non-aqueous electrolyte occurs on many micropores having a micropore size of 2 nm or less, present in the basal portions, resulting in deterioration in long term charge-discharge cycle performance. The present inventors have then found that such a side reaction in a non-aqueous electrolyte secondary battery can be suppressed and performance in a long term charge-discharge cycle can be improved, by suppressing exposure of the basal portions due to cleavage of graphite particles and using graphite particles having a volume per mass of micropores having a micropore size of 2 nm or less, of 0.3 $mm^3/g$ or less, as determined from a nitrogen adsorption isotherm according to a DFT method, as a negative electrode active material.

Hereinafter, an exemplary embodiment of the present disclosure will be described in detail with reference to the drawings. The drawings referred to in the description of embodiments are schematically illustrated, and the dimensional ratio of any constituent component depicted in the drawings may be different from that of any actual constituent component. Any specific dimensional ratio and the like are to be determined in consideration of the following description.

[Non-Aqueous Electrolyte Secondary Battery]

A configuration of a non-aqueous electrolyte secondary battery (hereinafter, also designated as "battery") 10 is described with reference to FIG. 1. FIG. 1 is a longitudinal sectional view showing a configuration of a battery 10 of an exemplary embodiment. The battery 10 comprises a positive electrode 30, a negative electrode 40, and a non-aqueous electrolyte. A separator 50 is suitably provided between the positive electrode 30 and the negative electrode 40. The battery 10 has a structure, for example, in which a wound-type electrode assembly 14 formed by winding the positive electrode 30 and the negative electrode 40 with the separator 50 being interposed therebetween, and a non-aqueous electrolyte are housed in a battery case. Examples of such a battery case housing the electrode assembly 14 and the non-aqueous electrolyte can include a cylindrical, rectangular, coin-shaped, or button-shaped metal case, and a resin case (laminated battery) obtained by forming a sheet obtained by laminating metal foil by a resin sheet. Another form of electrode assembly, for example, a stacked electrode assembly formed by stacking alternately a positive electrode and a negative electrode with a separator being interposed therebetween may be here applied instead of the wound-type electrode assembly 14. A battery case is configured by a cylindrical case body 15 having a closed-end and a sealing assembly 16, in an example shown in FIG. 1.

The battery 10 comprises insulating plates 17 and 18 disposed on and under the electrode assembly 14, respectively. In an example shown in FIG. 1, a positive electrode lead 19 attached to the positive electrode 30 passes through a through-hole in the insulating plate 17 and extends toward the sealing assembly 16, and a negative electrode lead 20 attached to the negative electrode 40 passes through the outside of the insulating plate 18 and extends toward the bottom of the case body 15. For example, the positive electrode lead 19 is connected to the lower surface of the filter 22, which is the bottom board of the sealing assembly 16, by welding or the like, and the cap 26, which is the top board of the sealing assembly 16 and electrically connected to the filter 22, serves as a positive electrode terminal. The negative electrode lead 20 is connected to the inner surface of the bottom of the case body 15 by welding or the like, and the case body 15 serves as a negative electrode terminal. In the present embodiment, a current interrupt device (CID) and a gas-exhaust mechanism (safety valve) are provided on the sealing assembly 16. A gas-exhaust valve (not shown) is suitably provided also on the bottom of the case body 15.

The case body 15 is, for example, a cylindrical metal container having a closed-end. A gasket 27 is disposed between the case body 15 and the sealing assembly 16 to ensure that the interior of the battery case is tightly sealed. The case body 15 suitably includes, for example, a projecting portion 21 which is formed by pressing a lateral surface from outside and which supports the sealing assembly 16. The projecting portion 21 is preferably formed annularly along the circumferential direction of the case body 15, and the upper surface thereof supports the sealing assembly 16.

The sealing assembly 16 includes a filter 22 in which an opening 22a of the filter is formed, and a vent member disposed on the filter 22. The vent member closes the opening 22a of the filter 22, and ruptures if the internal pressure of the battery 10 increases by heat generation due to, for example, internal short. In the present embodiment, a lower vent member 23 and an upper vent member 25 are provided as such vent members, and an insulating member 24 disposed between the lower vent member 23 and the upper vent member 25, and a cap 26 having an opening 26a are further provided. Each of the members constituting the sealing assembly 16 has, for example, a disk or ring shape, and the members other than the insulating member 24 are electrically connected to each other. Specifically, not only the filter 22 and the lower vent member 23 are connected to each other at respective circumferences, but also the upper vent member 25 and the cap 26 are connected to each other at respective circumferences. The lower vent member 23 and the upper vent member 25 are connected to each other at respective middle portions, and the insulating member 24 is interposed between respective circumferences. If the internal pressure increases by heat generation due to, for example, internal short, for example, the lower vent member 23 ruptures at a thin portion thereof, and thus the upper vent member 25 swells toward the cap 26 and leaves the lower vent member 23, thereby breaking the electrical connection between the lower and upper vent members.

Hereinafter, a positive electrode 30, a negative electrode 40, a non-aqueous electrolyte, and a separator 50 for use in a non-aqueous electrolyte secondary battery 10 of an exemplary embodiment will be described in detail. Any symbols are omitted in the following description.

[Positive Electrode]

The positive electrode is configured from, for example, a positive electrode current collector of metal foil or the like, and a positive electrode active material layer formed on the positive electrode current collector. The positive electrode current collector here used can be, for example, foil of a metal, such as aluminum, which is stable in the electric potential range of the positive electrode, or a film in which such a metal is disposed on an outer layer. The positive electrode active material layer includes, for example, a positive electrode active material, a binder, and a conductive agent.

The positive electrode is obtained by, for example, coating the positive electrode current collector with a positive electrode mixture slurry including, for example, a positive electrode active material, a conductive agent, and a binder, and drying the resultant to thereby form the positive electrode active material layer on the positive electrode current collector, and then rolling the positive electrode active material layer. The thickness of the positive electrode current collector is not particularly limited, and is, for example, about 10 μm or more and 100 μm or less.

The positive electrode active material layer includes a positive electrode active material including a lithium/transition metal oxide. The lithium/transition metal oxide can be, for example, a lithium/transition metal oxide containing lithium (Li) and any transition metal element(s) such as cobalt (Co), manganese (Mn), and/or nickel (Ni). The lithium/transition metal oxide may include any additive element(s) other than Co, Mn, and Ni, and examples include aluminum (Al), zirconium (Zr), boron (B), magnesium (Mg), scandium (Sc), yttrium (Y), titanium (Ti), iron (Fe), copper (Cu), zinc (Zn), chromium (Cr), lead (Pb), tin (Sn), sodium (Na), potassium (K), barium (Ba), strontium (Sr), calcium (Ca), tungsten (W), molybdenum (Mo), niobium (Nb), and silicon (Si).

Specific examples of the lithium/transition metal oxide include $Li_xCoO_2$, $Li_xNi_2$, $Li_xMnO_2$, $Li_xCo_yNi_{1-y}O_2$, $Li_xCo_yM_{1-y}O_z$, $Li_xNi_{1-y}M_yO_z$, $Li_xMn_2Od_4$, $Li_xMn_{2-y}M_yO_4$, $LiMPO_4$, $Li_2MPO_4F$ (in each chemical formula, M is at least one of Na, Mg, Sc, Y, Mn, Fe, Co, Ni, Cu, Zn, Al, Cr, Pb, Sb, and B, $0<x\leq1.2$, $0<y\leq0.9$, $2.0\leq z\leq2.3$). Such lithium/transition metal oxides may be used singly or a plurality thereof may be mixed and used.

The conductive agent here used can be a known conductive agent that enhances electric conductivity of the positive electrode mixture layer, and examples include carbon powders such as carbon black, acetylene black, Ketjenblack, and graphite. These may be used singly or in combinations of two or more thereof.

The binder here used can be any known binder which maintains a favorable state of contact with the positive electrode active material and/or the conductive agent and which enhances bindability of the positive electrode active material to a surface of the positive electrode current collector, and examples thereof include a fluoropolymer and a rubber polymer. Examples of the fluoropolymer include polytetrafluoroethylene (PTFE), poly(vinylidene fluoride) (PVdF), and any modified product thereof, and examples of the rubber polymer include an ethylene-propylene-isoprene copolymer and an ethylene-propylene-butadiene copolymer. These may be used singly or in combinations of two or more thereof. The binder may be used in combination with a thickener such as carboxymethyl cellulose (CMC) or polyethylene oxide (PEO).

[Negative Electrode]

The negative electrode is configured from, for example, a negative electrode current collector of metal foil or the like, and a negative electrode active material layer formed on the negative electrode current collector. The negative electrode current collector here used can be, for example, foil of a metal, such as copper, which is stable in the electric potential range of the negative electrode, or a film in which such a metal is disposed on an outer layer. The negative electrode active material layer includes, for example, a negative electrode active material, a binder, and a thickener.

The negative electrode can be produced by, for example, coating the negative electrode current collector with a negative electrode mixture slurry including, for example, a negative electrode active material, a binder, and a thickener, drying the resultant coating, and then rolling the coating to thereby form the negative electrode active material layer on each of both sides of the current collector. The thickness of the negative electrode current collector is preferably 5 μm or more and 40 μm or less, more preferably 10 μm or more and 20 μm or less from the viewpoint of, for example, current collecting properties and mechanical strength.

The negative electrode in the present disclosure contains graphite particles having a volume per mass of micropores having a micropore size of 2 nm or less, of 0.3 mm$^3$/g or less, as determined from a nitrogen adsorption isotherm according to a DFT method, as a negative electrode active material that intercalates and deintercalates lithium ions. Herein, the "volume per mass of micropores having a micropore size of 2 nm or less" in the negative electrode active material or graphite particles is also designated as "volume of micropores of 2 nm or less".

It is thus considered that a side reaction with a non-aqueous electrolyte is suppressed and long term cycle characteristics of the non-aqueous electrolyte secondary battery are improved by using the graphite particles having a volume of micropores of 2 nm or less, of 0.3 mm$^3$/g or less, as the negative electrode active material. The volume of micropores of 2 nm or less, in the graphite particles, is preferably 0.2 mm$^3$/g or less, more preferably 0.1 mm$^3$/g or less. The lower limit of the volume of micropores of 2 nm or less, in the graphite particles, is not particularly limited, may be equal to or less than the detection limit, and is, for example, preferably 0.005 mm$^3$/g or more from the viewpoint of, for example, availability and cost.

The volume of micropores of 2 nm or less, in the graphite particles, may be determined from a nitrogen adsorption isotherm of the graphite particles according to a known method performed using a DFT method (Density Functional Theory), and can be measured with, for example, a specific surface area measuring apparatus (autosorb iQ-MP manufactured by Quantachrome Instruments). Particularly, the measurement is as follows. An adsorption isotherm dealing with various micropore sizes is calculated by simulation in advance. Then, an adsorption isotherm of the graphite particles is determined using a nitrogen gas, and the resulting adsorption isotherm is analyzed, and superposed with the adsorption isotherm calculated by simulation. Thus, the volume per mass of micropores having each micropore size, of the graphite particles, can be calculated, and thus the volume per mass of micropores having a micropore size of 2 nm or less can be determined based on the calculation result.

The graphite particles in the present embodiment may be any graphite material conventionally used as any negative electrode active material for non-aqueous electrolyte secondary batteries, and, for example, natural graphite such as massive graphite and earthy graphite, and artificial graphite such as massive artificial graphite and graphitized mesophase carbon microbeads can be used.

The graphite particles in the present embodiment, having a volume of micropores of 2 nm or less, within the scope of the present disclosure, are obtained by, for example, preparing graphite particles suppressed in exposure of the basal planes of graphite crystals. Examples of the method for preparing such graphite particles include a method involving applying impact or a shear force to a graphitized product subjected to a graphitization treatment, and examples of a specific method include a method involving pulverizing the graphitized product in an inert atmosphere. For example, a ball mill, a hammer mill, a pin mill, or a jet mill can be used in the pulverizing method. Examples include a method involving coating surfaces of the graphite particles with coal or petroleum pitch, and furthermore performing a heat treatment to thereby cover basal planes exposed, with a carbonized product of the pitch. In the step of producing the graphite particles, exposure of the basal plane of graphite crystals can be suppressed by subjecting, for example, a carbon material serving as a raw material to a pulverization treatment prior to a heat treatment (graphitization treatment), to result in adjustment to a predetermined particle size distribution, and then performing the heat treatment. The temperature of the heat treatment may be in any conventional graphitization treatment temperature range, and may be, for example, 1800° C. to 3000° C. Not only such artificial graphite, but also natural graphite having a volume of micropores of 2 nm or less, within the scope of the present disclosure, may be used.

The graphite particles in the present embodiment preferably have a BET specific surface area of 0.3 m$^2$/g or more, more preferably 0.5 m$^2$/g or more. It is considered that such graphite particles having a BET specific surface area in the range are enhanced in load characteristics (rate characteristics) due to exposure of the edge planes of graphite crystals, where insertion/elimination of lithium ions are made according to charge and discharge. The upper limit of the BET specific surface area of the graphite particles is not particularly limited, and is preferably 2 m$^2$/g or less, more preferably 1.5 m$^2$/g or less from the viewpoint of suppression of a side reaction with a non-aqueous electrolyte. The BET specific surface area of the graphite particles may be measured by a known method and may be measured, for example, based on a BET method with a specific surface area measuring apparatus (Macsorb (registered trademark) HM model-1201 manufactured by MOUNTECH Co., Ltd.).

Figure 2:
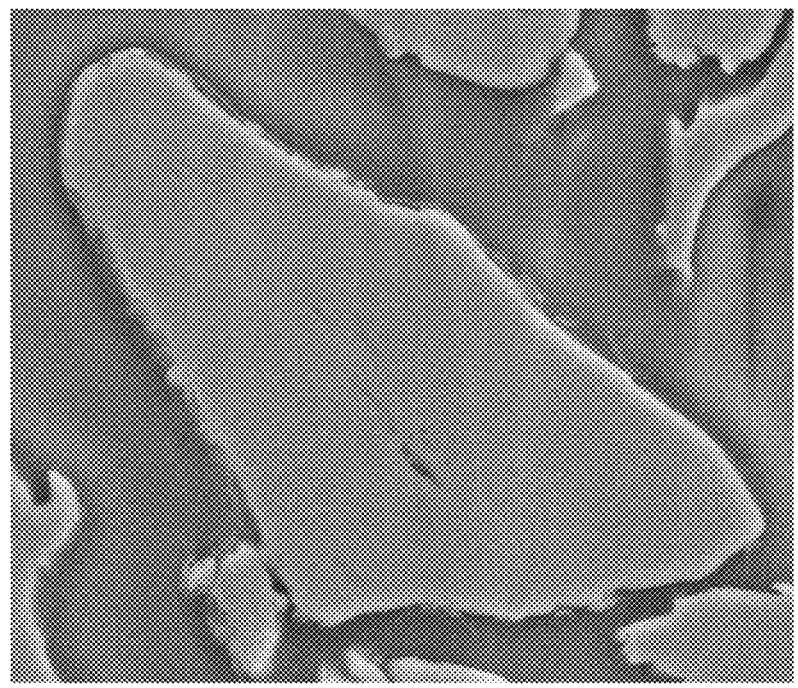
FIG. 2 is an electron microscope image showing cross sections of graphite particles (Example 1) of an exemplary embodiment.
Figure 3:
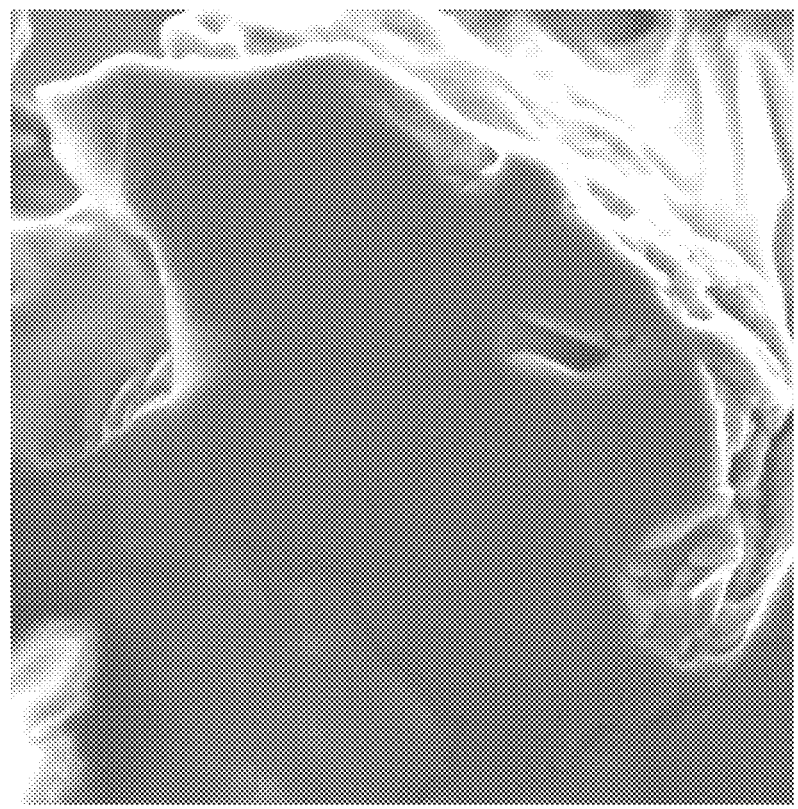
FIG. 3 is an electron microscope image showing cross sections of graphite particles (Example 2) of an exemplary embodiment.

FIG. 2 and FIG. 3 each show an image (hereinafter, designated as "SEM image") obtained by observing cross sections of graphite particles (see Examples 1 and 2 described below) in an example of the present embodiment, with a scanning electron microscope (SEM). As shown in FIG. 2 and FIG. 3, the graphite particles in the present embodiment may have any pores (hereinafter, also designated as "internal pores") formed therein. When many internal pores are formed in the graphite particles, it is considered that deterioration in ion conductivity and failure in electronic conductivity in the particles occur due to the change in graphite crystal volume according to charge and discharge. The ratio (hereinafter, also designated as "internal pore ratio") of the area of the internal pores to the total cross sectional area of the graphite particles in the SEM image of the particle cross sections of the graphite particles is preferably 0.05 or less, more preferably 0.08 or less from the above viewpoint.

The internal pore ratio of the negative electrode active material (graphite particles) can be determined by the following method. For example, the negative electrode active material layer formed on the negative electrode current collector is cut by a cross section polisher, and the cross section cut is observed with SEM. Particle cross sections are randomly selected in the resulting SEM image, and a visible outline along with each particle surface and profile lines of internal pores present in a region surrounded by the visible outline are drawn in each of the particle cross sections selected. The total cross sectional area of the particles and the total amount of areas of the internal pores are determined based on the visible outline and the profile lines drawn, and the internal pore ratio is calculated using the expression (Total amount of areas of internal pores/total cross sectional area of particles). For example, the internal pore ratio of the negative electrode active material can be determined by averaging the internal pore ratio calculated with respect to each of one hundred particle cross sections.

The internal pore ratio of the graphite particles for use as the negative electrode active material can be adjusted by, for example, appropriately modifying the ratio of the electrode current collector material and tar or pitch in immersion of a carbon material serving as an electrode current collector material, such as coke or natural graphite, in the tar or pitch in the course of production of graphite.

The graphite particles in the present embodiment have a volume average particle size of, for example, 5 μm or more and 30 μm or less, preferably 10 μm or more and 25 μm or less. The volume average particle size means a particle size which is the volume average particle size of the negative electrode active material, measured according to a laser diffraction scattering method, and in which the volume cumulative value in a particle size distribution is 50%. The volume average particle size of the graphite particles may be measured with, for example, a laser diffraction scattering particle size distribution measuring apparatus (manufactured by MicrotracBEL Corp.).

The negative electrode mixture layer may contain, for example, lithium metal, a lithium alloy such as a lithium-aluminum alloy, a lithium-lead alloy, a lithium-silicon alloy, or a lithium-tin alloy, graphite other than the graphite particles having a volume of micropores of 2 nm or less, in the range, a carbon material such as coke or an organic fired material, and/or a metal oxide such as $SnO_2$, $SnO$, or $TiO_2$, in addition to the graphite particles in the present embodiment, as the negative electrode active material. The graphite particles in the present embodiment are preferably at a rate of 50 mass % or more, more preferably 75 mass % or more based on the total amount of the negative electrode active material from the viewpoint of suppression of expansion and shrinkage of the negative electrode mixture layer in a charge-discharge cycle, and prevention of breakage of a covering formed on the negative electrode active material.

The binder here used may be, for example, a fluoropolymer or a rubber polymer as in the case of the positive electrode, or may be, for example, a styrene-butadiene copolymer (SBR) or a modified product thereof.

Examples of the thickener include carboxymethyl cellulose (CMC) or polyethylene oxide (PEO). These may be used singly or in combinations of two or more thereof.

[Non-Aqueous Electrolyte]

The non-aqueous electrolyte includes a non-aqueous solvent and an electrolyte salt dissolved in the non-aqueous solvent. The non-aqueous solvent for use in the non-aqueous electrolyte can be, for example, esters, ethers, nitriles, amides such as dimethylformamide, and a mixed solvent of two or more thereof, and a halogen-substituted product can also be used which is formed by replacing at least one hydrogen atom of any of the above solvents with a halogen atom such as fluorine. These may be used singly or in combinations of two or more thereof. The non-aqueous electrolyte is not limited to a liquid electrolyte (non-aqueous electrolyte solution), and may be a solid electrolyte using a gel polymer or the like.

Examples of the esters included in the non-aqueous electrolyte can include cyclic carbonates, chain carbonates, and carboxylate esters. Examples of the cyclic carbonates include ethylene carbonate (EC), propylene carbonate (PC), and butylene carbonate. Examples of the chain carbonates include dimethyl carbonate (DMC), ethyl methyl carbonate (EMC), diethyl carbonate (DEC), methyl propyl carbonate, ethyl propyl carbonate, and methyl isopropyl carbonate.

Examples of the carboxylate esters include methyl acetate, ethyl acetate, propyl acetate, methyl propionate (MP), ethyl propionate, γ-butyrolactone (GBL), and γ-valerolactone (GVL).

Examples of the cyclic ethers included in the non-aqueous electrolyte include 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and crown ethers.

Examples of the chain ethers included in the non-aqueous electrolyte include 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

Examples of the nitriles included in the non-aqueous electrolyte include acetonitrile, propionitrile, butyronitrile, valeronitrile, n-heptanenitrile, succinonitrile, glutaronitrile, adiponitrile, pimelonitrile, 1,2,3-propanetricarbonitrile, and 1,3,5-pentanetricarbonitrile.

Examples of the halogen-substituted product included in the non-aqueous electrolyte include fluorinated cyclic carbonate esters such as 4-fluoroethylene carbonate (FEC), fluorinated chain carbonate esters, and fluorinated chain carboxylate esters such as methyl 3,3,3-trifluoropropionate (FMP).

The electrolyte salt included in the non-aqueous electrolyte is preferably a lithium salt. The lithium salt may be any salt commonly used as a support salt in a conventional non-aqueous electrolyte secondary battery. Examples of the lithium salt include $LiBF_4$, $LiClO_4$, $LiPF_6$, $LiAsF_6$, $LiSbF_6$, $LiAlCl_4$, LiSCN, $LiCF_3SO_3$, $LiC(C_2F_5SO_2)$, $LiCF_3CO_2$, $Li(P(C_2O_4)F_4)$, $Li(P(C_2O_4)F_2)$, $LiPF_{6-x}(C_nF_{2n+1})_x$ (1≤x≤6, n is 1 or 2), $LiB_{10}Cl_{10}$, LiCl, LiBr, LiI, chloroborane lithium, lithium lower aliphatic carboxylate, borate salts such as $Li_2B_4O_7$, $Li[B(C_2O_4)_2]$ [lithium-bis(oxalato)borate (LiBOB)], and $Li[B(C_2O_4)F_2]$, and imide salts such as $Li[P(C_2O_4)F_4]$, $Li[P(C_2O_4)_2F_2]$, $LiN(FSO_2)_2$, and $LiN(C_lF_{2l+1}SO_2)(C_mF_{2m+1}SO_2)$ {where l and m are integers of 0 or more}. These lithium salts may be used singly or two or more thereof may be mixed and used.

[Separator]

For example, an ion-permeable and insulating porous sheet is used as the separator. Specific examples of the porous sheet include a microporous thin film, woven fabric, and nonwoven fabric. The material for the separator is, for example, suitably an olefin resin such as polyethylene or polypropylene, or cellulose. The separator may be a laminate including a cellulose fiber layer and a layer of fibers of a thermoplastic resin such as an olefin resin. The separator may be a multi-layered separator including a polyethylene layer and a polypropylene layer, and a surface of a separator to be used may be coated with a material such as an aramid resin or ceramic.

EXAMPLES

Hereinafter, the present disclosure will be further described with reference to Examples, but the present disclosure is not intended to be limited to the following Examples.

Example 1

[Production of Positive Electrode]

A lithium complex oxide represented by general formula $LiNi_{0.8}Co_{0.15}Al_{0.05}O_2$ was used as a positive electrode active material. Mixed were 100 mass % of the positive electrode active material, 1 mass % of acetylene black as a conductive agent, and 0.9 mass % of poly(vinylidene fluoride) as a binder, and N-methyl-2-pyrrolidone (NMP) was added thereto to thereby prepare a positive electrode mixture slurry. Then, both sides of a positive electrode current collector made of aluminum, having a thickness of 15 μm, were coated with the positive electrode mixture slurry by a doctor blade method, and the resultant coatings were rolled, to thereby form a positive electrode active material layer having a thickness of 70 μm on each of both sides of the positive electrode current collector. The resultant was adopted as a positive electrode.

[Production of Negative Electrode]

Coke and a pitch binder were pulverized and mixed, and then fired at 1000° C. and then subjected to a graphitization treatment at 3000° C. The resultant was pulverized by a ball mill in an $N_2$ atmosphere and the resultant powder was classified, to thereby obtain graphite particles a1. The nitrogen adsorption isotherm at −196° C., of graphite particles a1, was obtained with an autosorb iQ-MP apparatus (manufactured by Quantachrome Instruments). The resulting nitrogen adsorption isotherm was analyzed according to a DFT method to thereby determine the volume of micropores of 2 nm or less of graphite particles a1, and was analyzed according to a BET method to thereby determine the BET specific surface area of graphite particles a1. Graphite particles a1 had a volume of micropores of 2 nm or less, of 0.1 $mm^3/g$, and a BET specific surface area of 0.55 $m^2/g$. The volume average particle size of graphite particles a1 was measured with a laser diffraction scattering particle size distribution measuring apparatus (manufactured by MicrotracBEL Corp., MT3000), and was found to be 16.1 μm.

The internal pore ratio of graphite particles a1 was determined by the following method. Graphite particles a1 were cut by a cross section polisher, and particle cross sections obtained were observed with a scanning electron microscope (SEM) (JSM-7001F manufactured by JEOL Ltd.). A visible outline along with each particle surface was drawn in a SEM image of the particle cross sections of graphite particles a1, the total of the area (total cross sectional area) of a portion surrounded by the visible outline and the areas (pore areas) of pores present in a region surrounded by the visible outline were measured, and the ratio of the pore areas to the total cross sectional area was calculated. One hundred particle cross sections were randomly selected in the SEM image, and the average value of the ratios of the pore areas to the total cross sectional areas calculated with respect to such one hundred particle cross sections was defined as the internal pore ratio of graphite particles a1. The internal pore ratio of graphite particles a1 was 0.02. A SEM image (magnification: 5000×) of the particle cross sections of graphite particles a1 is shown in FIG. 2.

Mixed were 100 parts by mass of graphite particles a1, 1 part by mass of carboxymethyl cellulose (CMC) as a thickener, and 1 part by mass of a styrene-butadiene copolymer (SBR) as a binder, and water was added thereto to thereby prepare a negative electrode mixture slurry. Then, both sides of a negative electrode current collector made of copper, having a thickness of 10 μm, were coated with the negative electrode mixture slurry by a doctor blade method, and the resultant coatings were rolled to thereby form a negative electrode active material layer having a thickness of 80 μm on each of both sides of the negative electrode current collector. The resultant was adopted as a negative electrode.

[Preparation of Non-Aqueous Electrolyte]

Ethylene carbonate (EC), ethyl methyl carbonate (EMC), and dimethyl carbonate (DMC) were mixed at a volume ratio of 30:30:40 (room temperature). $LiPF_6$ was dissolved in such a mixed solvent, in an amount so as to be at a concentration of 1.3 mol/L in a non-aqueous electrolyte after preparation, to thereby prepare non-aqueous electrolyte.

[Production of Non-Aqueous Electrolyte Secondary Battery]

After the positive electrode and the negative electrode were cut to respective predetermined dimensions, an aluminum lead and a nickel lead were attached to the positive electrode and the negative electrode, respectively, and the positive electrode and the negative electrode were wound with a polyethylene separator being interposed therebetween, to thereby produce a wound-type electrode assembly. The electrode assembly was housed in a cylindrical battery case body having a closed-end and having an outer size of 18 mm and a height of 65 mm, the non-aqueous electrolyte solution was injected, and then the opening of the battery case body was sealed by a gasket and a sealing assembly, to thereby produce 18650-type cylindrical non-aqueous electrolyte secondary battery A1.

Example 2

Graphite particles a2 were produced in the same manner as in Example 1 except that a jet mill was used for pulverization in the step of producing the graphite particles. Graphite particles a2 were subjected to the same measurement as in graphite particles a1, and were found to have a volume of micropores of 2 nm or less, of 0.2 mm³/g, a BET specific surface area of 1.0 m²/g, an internal pore ratio of 0.14, and a volume average particle size of 15.0 μm. FIG. 3 shows a SEM image (magnification: 5000×) of particle cross sections of graphite particles a2. Cylindrical non-aqueous electrolyte secondary battery A2 was produced in the same manner as in Example 1 except that graphite particles a2 were used instead of graphite particles a1.

Comparative Example 1

Figure 4:
FIG. 4 is an electron microscope image showing particle cross sections of graphite particles of Comparative Example 1.

A graphitized product obtained in the graphitization treatment in Example 1 was pulverized by a roller mill in an inert atmosphere, and the resultant powder was classified, to thereby obtain graphite particles b1. Graphite particles b1 were subjected to the same measurement as in graphite particles a1, and were found to have a volume of micropores of 2 nm or less, of 0.4 mm³/g, a BET specific surface area of 3.8 m²/g, an internal pore ratio of 0.15, and a volume average particle size of 22 μm. FIG. 4 shows a SEM image (magnification: 5000×) of particle cross sections of graphite particles b1. Cylindrical non-aqueous electrolyte secondary battery BI was produced in the same manner as in Example 1 except that graphite particles b1 were used instead of graphite particles a1.

Comparative Example 2

Figure 5:
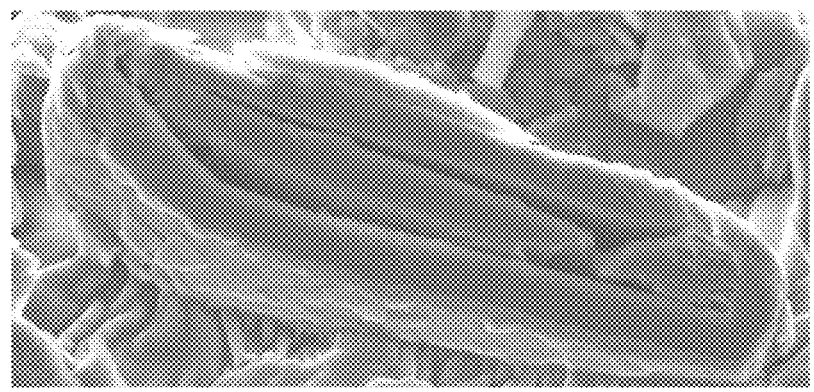
FIG. 5 is an electron microscope image showing particle cross sections of graphite particles of Comparative Example 2.

Graphite particles b2 were produced in the same manner as in Comparative Example 1 except that pulverization was performed in an air atmosphere in the step of producing the graphite particles. Graphite particles b2 were subjected to the same measurement as in graphite particles a1, and were found to have a volume of micropores of 2 nm or less, of 0.6 mm³/g, a BET specific surface area of 4.4 m²/g, an internal pore ratio of 0.20, and a volume average particle size of 17.5 μm. FIG. 5 shows a SEM image (magnification: 5000×) of particle cross sections of graphite particles b2. Cylindrical non-aqueous electrolyte secondary battery B2 was produced in the same manner as in Example 1 except that graphite particles b2 were used instead of graphite particles a1.

[Charge-Discharge Cycle Test]

Each of the batteries produced in Examples and Comparative Examples was subjected to a charge-discharge cycle test according to the following procedure. First, each of the batteries was charged to a battery voltage of 4.1 V at a constant current of 0.3 It and then charged to a current value of 0.05 It at a constant voltage, in an environment of a temperature of 25° C. Then, each of the batteries was discharged to a voltage of 3.0 V at a constant current of 0.5 It. Such charge and discharge were repeatedly performed for 500 cycles. Herein, 1 It corresponded to a current value for discharging the battery capacity in 1 hour. Then, the capacity retention rate of each of the batteries after a long cycle was determined according to the following expression. It was indicated that, as the capacity retention rate was higher, long term cycle characteristics were more improved.

Capacity retention rate=(Discharge capacity at 500$^{th}$ cycle/Discharge capacity at 1$^{st}$ cycle)×100

[Discharge Rate Test]

Each of the batteries produced in Examples and Comparative Examples was subjected to a discharge rate test according to the following procedure. Each of the batteries was charged to a battery voltage of 4.1 V at a constant current of 0.3 It and then charged to a current value of 0.05 It at a constant voltage, in an environment of a temperature of 25° C. Then, the discharge capacity in the case of discharge to a discharge cutoff voltage of 3.0 V at a constant current of 0.5 It and the discharge capacity in the case of discharge to a discharge cutoff voltage of 3.0 V at a constant current of 0.2 It were each measured. The ratio (capacity ratio 0.5 It/0.2 It) of the discharge capacities obtained at the discharge rates was determined. It was indicated that, as the capacity ratio was higher, discharge rate characteristics were more excellent.

Table 1 shows the results of the volume of micropores of 2 nm or less, the BET specific surface area and the internal pore ratio of the graphite particles used as the negative electrode active material, and the capacity retention rate after the charge-discharge cycle test and the capacity ratio 0.5 It/0.2 It in the discharge rate test, with respect to each of the batteries of Examples 1 to 2 and Comparative Examples 1 to 2.

TABLE 1

| | Graphite particles | | | Non-aqueous electrolyte secondary battery | |
|---|---|---|---|---|---|
| | Volume of micropores of 2 nm of less [mm³/g] | BET specific surface area [m²/g] | Internal pore ratio | Capacity retention rate after 500 cycles [%] | 0.5 It/ 0.2 It Capacity ratio [%] |
| Example 1 | 0.1 | 0.55 | 0.02 | 90.2 | 95 |
| Example 2 | 0.2 | 1.0 | 0.14 | 89.8 | 95 |
| Comparative Example 1 | 0.4 | 3.8 | 0.15 | 88.6 | 95 |
| Comparative Example 2 | 0.6 | 4.4 | 0.20 | 86.9 | 94 |

As described in Table 1, the non-aqueous electrolyte secondary batteries of Examples 1 and 2, in which graphite particles a1 and a2 each having a volume of micropores of 2 nm or less, of 0.3 mm³/g or less, were used, each exhibited a high value of capacity retention rate after the long term charge-discharge cycle test, as compared with the non-aqueous electrolyte secondary batteries of Comparative Examples 1 and 2, in which graphite particles b1 and b2 each having a volume of micropores of 2 nm or less, of more than 0.3 mm³/g, were used.

REFERENCE SIGNS LIST 10 non-aqueous electrolyte secondary battery (battery)
14 electrode assembly
15 case body
16 sealing assembly
17, 18 insulating plate
19 positive electrode lead
20 negative electrode lead
21 projecting portion
22 filter 22a opening of filter
23 lower vent member
24 insulating member
25 upper vent member
26 cap
26a opening of cap
27 gasket
30 positive electrode
40 negative electrode
50 separator

The invention claimed is:

1. A non-aqueous electrolyte secondary battery comprising:
   a positive electrode;
   a negative electrode; and
   a non-aqueous electrolyte; wherein
   the negative electrode contains graphite particles having a volume per mass of micropores having a micropore size of 2 nm or less, of 0.3 mm$^3$/g or less, as determined from a nitrogen adsorption isotherm according to a DFT method, as a negative electrode active material,
   a ratio of areas of internal pores to a total cross sectional area in a SEM image of cross sections of the graphite particles is 0.14 or less, and
   the graphite particles have surfaces coated with a carbonized product.

2. The non-aqueous electrolyte secondary battery according to claim 1, wherein the graphite particles have a specific surface area of 0.5 m$^2$/g or more, according to a BET method.

3. The non-aqueous electrolyte secondary battery according to claim 1, wherein the ratio of areas of internal pores to a total cross sectional area in a SEM image of cross sections of the graphite particles is 0.05 or less.

* * * * *